(No Model.)

F. P. SMITH.
CAR AXLE.

No. 290,938. Patented Dec. 25, 1883.

WITNESSES:
Francis McArdle
C. Sedgwick

INVENTOR:
F. P. Smith
BY Munn & Co.
ATTORNEYS.

UNITED STATES PATENT OFFICE.

FRANCIS P. SMITH, OF BOSTON, MASSACHUSETTS.

CAR-AXLE.

SPECIFICATION forming part of Letters Patent No. 290,938, dated December 25, 1883.

Application filed October 15, 1883. (No model.)

*To all whom it may concern:*

Be it known that I, FRANCIS P. SMITH, of Boston, in the county of Suffolk and State of Massachusetts, have invented a new and Improved Car-Axle, of which the following is a full, clear, and exact description.

My invention consists of an improved contrivance of apparatus for arranging the wheels on an axle of two sections for independent action when running on curves, as hereinafter described.

Reference is to be had to the accompanying drawings, forming part of this specification, in which similar letters of reference indicate corresponding parts in all the figures.

Figure 1:
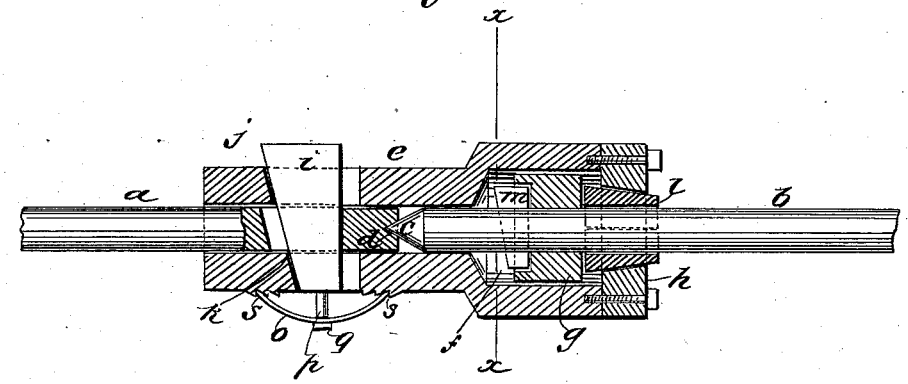
Figure 2:
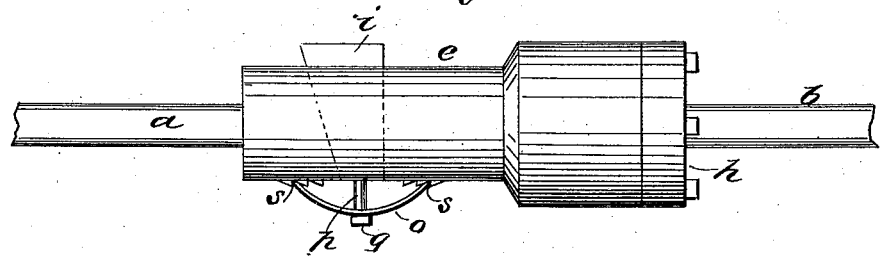
Figure 3:
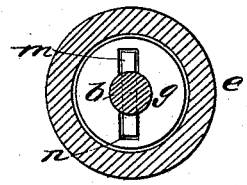
Figure 4:
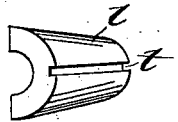

Figure 1 is a sectional elevation of the coupling device of my improved axle. Fig. 2 is a side elevation of the same. Fig. 3 is a section on the line $x\,x$ of Fig. 1, and Fig. 4 is a perspective view of part of a box for one end of the coupling device.

The axle is made of two separate sections, $a\,b$, which meet together at the ends, at about the middle of the distance between the wheels, and said ends are centered by a point, $c$, of one entering a socket, $d$, of the other. For coupling said sections substantially together, I employ a strong sleeve, $e$, bored to fit the axle for the most part of its length, but having an enlarged socket, $f$, in one end to receive a collar, $g$, on section $b$, behind the cap $h$, firmly bolted onto the end of the sleeve, said collar, together with the key $i$, being to hold the axle against lengthwise movement in the sleeve, and to bind the two sections of the axle firmly together. The key is inserted through a slot, $j$, of the sleeve; also through a slot, $k$, of section $a$ of the shaft, so as to draw section $a$ against section $b$ and press collar $g$ against cap $h$, or against the conical box $l$, fitted in said cap. The box $l$ is made in two parts, to enable them to be dressed off on the edges from time to time, in case they wear slack, for refitting. It also facilitates the taking of the box off and putting it on the axle without separating the two sections of the axle. The collar $g$ is in this example secured to the axle by a key, $m$, passing through the axle and fitting in a recess, $n$, of the collar; but it may be forged on the axle, if preferred. The key $i$ is secured by a spring, $o$, which continually presses it inward and keeps it to its proper bearing. The connection is by a stem, $p$, of the key passing through the spring and secured by a head, $q$, and the sleeve is provided with notched rests $s$, for the ends of the spring, to confine the spring in position and to adjust its tension, which is done by setting the ends closer together or farther apart.

It will be seen that the part $b$ of the axle may turn freely in the sleeve, and that both parts of the axle will be firmly bound together and to the sleeve, so as to avoid any slack or looseness, and making a divided axle equally as substantial as the common solid axles.

I may have a solid bearing in the cap $h$ for the part $b$ of the axle, dispensing with the conical box $l$, as there will not be much wear in the box, because the box and the axle revolve together, except when running on curves. In that case the collar $g$ will bear directly against the cap $h$.

The box $l$ has a groove, $t$, in the back of one or both of the parts to be held by keys or studs in the hole of the cover $h$, to prevent the box from turning with the shaft.

The weight of the sleeve balances to some extent the weight of the car on the overhanging journal-bearings of the axles, and so far overcomes the upward thrust of the middle of the axle when made in two parts.

I am aware that it is not broadly new to make a car-axle in two parts and connect them by a sleeve and key, so that the axle-sections may revolve independently of each other; but What I do claim as new and of my invention is—

1. The combination, in a divided axle-joint, of the sleeve $e$, cover $h$, collar $g$, key $i$, and the divided box $l$, substantially as described.

2. The combination, in a divided axle-joint, of the sleeve $e$, cover $h$, collar $g$, and the key $i$, with the axle made in two sections, $a\,b$, and being centered at the ends by point $c$ and socket $d$, substantially as described.

3. The combination of spring $o$ with the key $i$, having the headed stem $p$, and the sleeve $e$, having the series of notches $s$ for the end bearings of the springs, substantially as described.

FRANCIS P. SMITH.

Witnesses:
NATHAN S. ALBEE,
SAMUEL CANNING, Jr.